Nov. 8, 1960            E. OLALAINTY            2,958,956
PSYCHOLOGICAL TESTING APPARATUS
Filed Dec. 31, 1957                                  2 Sheets-Sheet 1
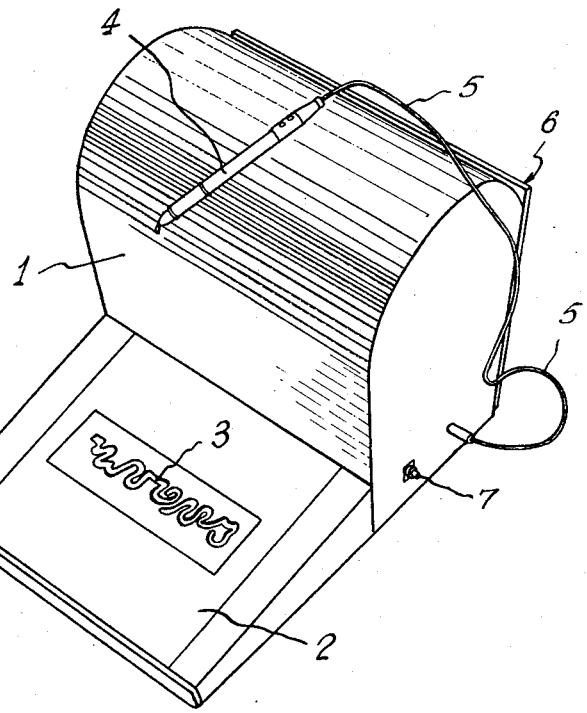
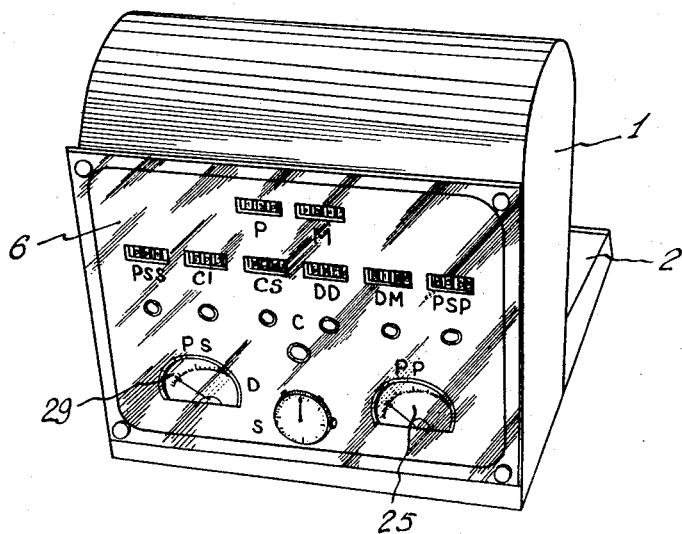

Nov. 8, 1960    E. OLALAINTY    2,958,956
PSYCHOLOGICAL TESTING APPARATUS
Filed Dec. 31, 1957    2 Sheets-Sheet 2
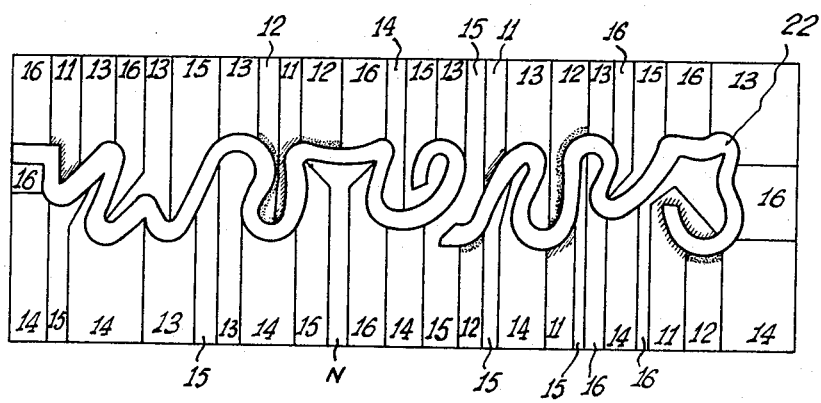
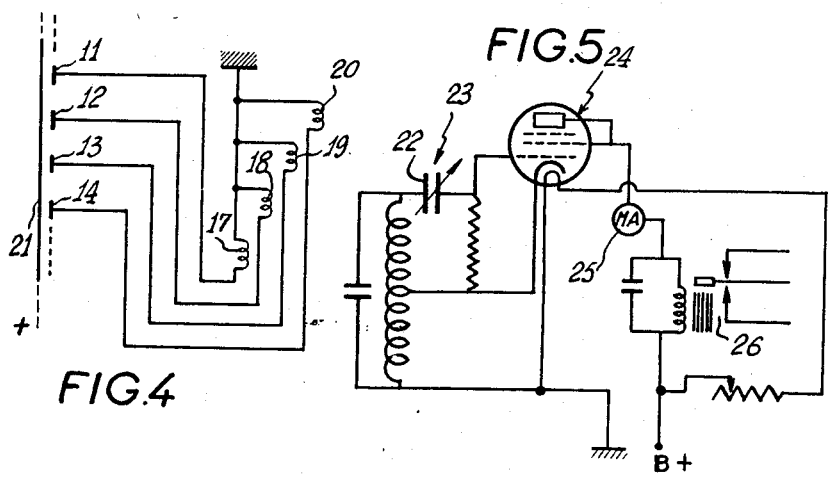
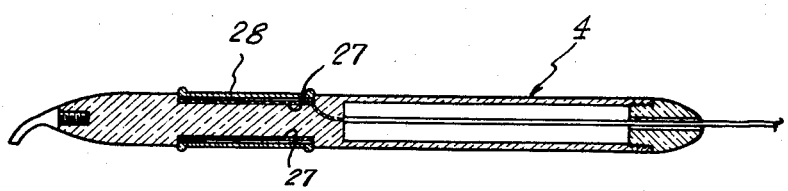

United States Patent Office 2,958,956
Patented Nov. 8, 1960

2,958,956
PSYCHOLOGICAL TESTING APPARATUS
Edouard Olalainty, 71 Rue de Fez, Tangier, Morocco
Filed Dec. 31, 1957, Ser. No. 706,352
Claims priority, application Morocco Jan. 18, 1957
7 Claims. (Cl. 35—22)

This invention relates generally to methods of psychological testing and more especially to methods and apparatus for psychography, that is, for deriving what is generally known as the "psychological profile" of an individual. The psychological profile is a set of data which indicate in terms of certain accepted, standard, ratings, the relative dominance of a number of basic psychological and/or personality traits characteristic of the individual under test. The derivation of psychological profiles is a standard present-day routine in such organizations as educational and vocational centers, military recruiting services, psychiatric hospitals, homes for backward children, penal and reformatory establishments, and the like.

Heretofore, psychological profiles have usually been obtained by submitting the test subject to a number of selected tests, such as a concentration test, personality (e.g. Rohrschach) tests, etc., each such test generally involving some rather lengthy performance on the part of the tested subject and an interpretation and rating by the investigator of such performance in respect to each individual test. The procedure is slow and time-consuming especially where a large number of subjects are to be tested; moreover the relatively large degree of personal interpretation involved on the part of the investigator, as regards many of these tests, tends to render the results scientifically untrustworthy.

It is an object of this invention to permit of establishing a complete, or substantially complete, psychological profile by means of a single test. An object is to expedite the establishment of psychological profiles. Another object is to eliminate completely the investigator's personal or interpretive factor from the results of psychological tests. A further object is to permit a scientific and objective investigation of certain psychological or personality traits not heretofore amenable to precise analysis.

It is universally recognized by present-day psychologists that the various traits of character and personality which it is the purpose of psychological profile tests to indicate and measure, find expression in the individual's tactile or motor tendencies, particularly the slight muscular motions and pressures of fingers and wrist in such manual activities as handwriting. It is for this reason that handwriting is a key to character. However, the very large amount of subjectivity and interpretation inherent in any attempt to analyse a person's script has heretofore precluded graphology from unrestricted recognition as an exact science. It is also an object of this invention to provide means for scientifically analyzing and measuring the tactile and/or motor tendencies of an individual as expressed in the latter's handwriting.

In accordance with an important aspect of this invention, there is provided in psychological testing apparatus of the type described, means defining a continuous, sinuous track (e.g. bounded by electrically conductive material), said track comprising a number of consecutive elementary segments of a plurality of types, each type corresponding to a predetermined psychological trait, a stylus (e.g. of electrically conductive material) adapted to be grasped by a test subject for tracing the track, means sensing the making of a contact between the stylus and a boundary of said track within each of said elementary segments, and means for separately counting the number of said contacts occurring in each type of segment, whereby the relative counts will provide a picture of the relative dominance of the corresponding traits in the test subject's psychology, i.e. the subject's psychological profile.

I am well aware that psychological testing apparatus have previously been constructed, including a sinuous track or contour which, during the performance of the test, is traced by a stylus held by the test subject, and counting means for counting the times the stylus has strayed from its prescribed course, as sensed by the contacts of the conductive stylus with a conductive boundary of the track. Such apparatus is conventionally used for rating the power of concentration of a subject in terms of the time required by the subject to trace out a contour of given length and intricacy and the number of errors made in the process. However, all conventional apparatus of this and related types have generally been restricted to rating a single psychological characteristic (such as concentration), whereas my improved apparatus departs radically therefrom in that, among other features that will appear, it is inherently capable of simultaneously indicating a set of different characteristics of substantially deeper significance in the establishment of a psychological profile than any single trait such as concentration can indicate.

In accordance with the invention, the types of elementary segments of which the track is composed, may include the following basic types: upstrokes; downstrokes; top curves; bottom curves; however, additional types of contour segments examples of some of which will be given hereinafter, may and preferably are also included in the contour of the track. The segments are joined sequentially with one another in an appropriate order, and each segment is electrically insulated from the adjacent segments. All the segments pertaining to a common type are connected in common to an individual counter, so that on completion of a test the array of counters will yield separate totalized indications as to the number of times the test subject has allowed the stylus in his hand to stray out of control and strike a boundary of the track for each type of segment. The relative counts thus registered at the end of a test will yield a set of relative numerical data susceptible of immediate and objective interpretation in accordance with standard psychological knowledge.

In accordance with another feature of the invention, means are provided for measuring and indicating the finger pressure exerted by the subject on the stylus and also the pressure under which the subject is applying the stylus on the track. Each of these indications as determined for each type of segment will yield additional valuable data for the establishment of the subject's psychological profile as will readily be understood by those familiar with psychology.

In a preferred embodiment of the invention to be presently described in detail, the boundary of each contour segmnet of the track constitutes one terminal of an electrical circuit the opposite terminal of which is provided by the tip of the stylus. All of the track segment terminals relating to track segments of a given shape or type are connected in common to a related counter of conventional design. Further, the track is secured to an electrically conductive plate mounted with a certain degree of resiliency relative to the frame of the apparatus, and constituting one armature of a capacity having another armature secured fixedly in the base of the frame in capacitive relation with said first armature. The capacity is connected in the tuned circuit of an amplifier to vary the output thereof in response to the variations in the capacity, thereby to indicate on a suitable indicating and/or recording instrument the degree of pressure exerted at any time by the stylus on the track. According to yet a further feature the stylus itself is constructed as a capacitive pressure pick-off of generally similar character to that just described in order to yield further indications and/or record of the finger pressure exerted on the stylus at any time. The indications provided by the variations of each of the pressures as just mentioned are preferably registered or recorded in such a manner as to permit of their being correlated with each type of segment on the track. Thus the combined data provided simultaneously by the counts of the numbers of times the stylus has strayed from the track for each type of segment, the stylus pressure on the track for each type of segment, and the finger pressure on the stylus for each type of segment, will yield a very complete and thorough picture of the subject's tactile motor tendencies and hence contribute to the establishment of the subject's psychological profile.

An exemplary embodiment of the invention will now be described by way of illustration but not of limitation with reference to the accompanying diagrammatic drawings, wherein:

Fig. 1 is a front perspective view of the apparatus as a whole;

Fig. 2 is a rear perspective view thereof;

Fig. 3 illustrates one example of a suitable testing track usable in accordance with the invention, on a larger scale than that of the preceding figures;

Fig. 4 is a partial and simplified electric circuit diagram relating to the counting means;

Fig. 5 is a partial circuit diagram relating to a pressure-indicating means; and Fig. 6 is an axial sectional view of a stylus according to the invention.

Referring to the drawings, the improved apparatus is shown as enclosed in a casing 1 formed with a forwardly jutting base panel 2 preferably sloping downwards at a slight angle and supporting a test track 3 of a type to be described in detail hereinafter. A stylus 4 also to be described in further detail is connected with the internal circuitry contained in casing 1 by way of a flexible lead 5 so as to be conveniently guided by a test subject's hand along the track 3.

The rear wall of casing 1 which normally would be directed toward a psychologist or other test operator provides a vertical panel formed with a number of viewing windows through which the indications of as many separate counters and dial instruments may be conveniently observed. The counters are eight in number in the example shown and are respectively designated P, M, PSS, CI, CS, DD, DM and PSP, the significance of which designations will be given at a later point. Adjacent to each of the last six above-designated counter windows there is a signal lamp which is adapted to light up every time a unit is registered by the related counter. Near the base of the panel a pair of milliammeter dials 25 and 29 are mounted being viewable through the windows designated PP and PS respectively. An additional signal lamp C is arranged to be illuminated when the circuits of the apparatus are placed under power. The dial instrument shown at S is a suitable timekeeper or stop-watch. Press-button switch 7 designates a signal bell control.

Referring to Fig. 3, the test track there shown is seen to comprise a series of interconnected segments broadly similar to the elementary components of handwritten script having basic psychological significance, and linked with one another in accordance with the principal dynamical combinations found in handwriting. As shown, the plurality of segments of the track may be broken down into the following four principal types: "Bottom curves," "Top curves," "Downstrokes" and "Upstrokes." Moreover, certain areas of the track are of a character that is associated by psychologists with the tendency to "Impulsion," and other areas are of a character associated with the psychological trait of "Restriction."

Thus there are six types in all provided in the exemplary embodiment of the apparatus, and these six types are herein designated for convenience of further reference by the following symbols: Downstroke segments, DD; Upstroke segments, DM; Bottom curve segments, CI; Top Curve segments, CS; "Impulsional" segments, P; "Restrictional" segments, M.

The track thus provided is in the form of a circuitous strip of insulating material of appropriate width and is bounded along both of its opposite sides by separate conductive strips with adjacent strips electrically insulated from each other. All the strips bounding P-type segments as defined above are designated by the common reference numeral 11, all strips bounding M-type segments by numeral 12, all strips bounding CS-, CI-, DM- and DD-type segments, by the respective reference numerals 13, 14, 15 and 16.

Referring now to Fig. 4, all the strips 11 corresponding to P-type segments are connected in common to one terminal of a suitable counter circuit, herein schematically represented by an inductance 17; similarly all the strips 12, 13, 14, 15 and 16 are respectively connected in common to a corresponding one of a set of counters. In Fig. 4 only the four counters 17, 18, 19 and 20 corresponding to segments 11, 12, 13 and 14 are shown. The opposite end of each counter circuit is connected to the common mass of the apparatus, or negative terminal of the current source, while the positive terminal of the source, indicated as conductor 21, is connected to the tip of the stylus. Thus every time the stylus tip contacts any segment the particular counter circuit with which all segments of the same type as the contacted segment are connected, is energized so as to increase by one unit the number indicated by the particular counter. Since the counters may be quite conventional, e.g. drum-type counters, their construction has not been illustrated. In Fig. 2, the six windows through which the respective counters are viewed are designated by the same letter symbols as the six types of segments to which the counters correspond.

Means will now be described for measuring the pressure of the subject's grip on the stylus and the pressure with which the stylus is applied by him against the track. Both pressure measurements may be performed by capacitive circuits of a similar type, one example of which is shown in Fig. 5. In this figure the condenser 23 is the measuring condenser. In the case of the measurement of the stylus pressure on the track, condenser 23 has a movable armature 22 constituted by a conductive plate on which the track is secured, which plate is yieldingly mounted through any suitable means in the apparatus frame for slight movement toward and away from a fixed plate (not shown) forming the opposite armature of the measuring condenser. In connection with the measurement of stylus gripping pressure, condenser 23 would be embodied in the stylus itself as presently described with reference to Fig. 6.

In either case the measuring condenser 23 may be connected in the control grid circuit of a pentode amplifier tube 24 in the manner shown in Fig. 5. As shown, the control grid circuit includes a tuned circuit comprising an inductance and capacity in parallel connected between the control grid and ground. The inductance has a midtap connected to the cathode of the tube and further connected to the control grid through a grid bias resistor. The measuring condenser 23 is inserted in series between the control grid and the inductance-capacitance circuit. The anode of the tube is connected to positive battery by way of a milliammeter type indicating instrument 25 and the winding of a differential relay 26 the function of which will be explained later. It will be understood that any variation in the capacitance of condenser 23, as resulting from varying pressure of the test subject's grip on the stylus or application of the stylus on the track, as the case may be, will cause a corresponding variation in the anode current of the pentode and in the indication given by meter 25. In Fig. 2, the dial of meter 25 is shown as viewable through the rear panel of the apparatus for indicating say the gripping pressure on the stylus, while a similar ammeter dial is shown at 29 for indicating the application pressure of the stylus on the track. The indicating instruments such as 25 and 29 may of course be replaced or complemented with suitable recording devices. Furthermore, the relay winding 26 is so predetermined that when the anode current in the pentode exceeds a predetermined value, corresponding to a predetermined high degree of muscular pressure exerted by the test subject say 150 grams per square centimeter, the relay is operated to actuate a counter device (not shown) which may be similar to the counter devices previously mentioned in connection with the track segments. The counter is actuated to add one unit to the count indicated by it, as appearing through a window formed in the rear panel of the apparatus similar to the counter windows relating to the track segments. In Fig. 2 the counter window indicating the number of times the test subject's finger grip on the stylus has exceeded the predetermined level is shown at PSP, while the counter window indicating the number of times the subject's wrist pressure on the track has exceeded a predetermined level is shown at PSS; respective signal lamps are shown associated with both counter windows.

Referring to Fig. 6, the stylus 4 is shown as comprising a generally tubular body of conductive material which may be connected to the common ground of the apparatus. A metallic bushing 27 is mounted around a reduced-diameter, solid, portion of the body in insulated relationship therewith, to provide an inner armature for the measuring condenser 23. Surrounding bushing 27 and insulated therefrom while being electrically connected with the body of the stylus is an outer bushing 28 made with substantial resiliency or flexibility so as to yield under finger pressure and modify the capacitance of the condenser constituted by bushings 27 and 28. The inner bushing 27 has a conductor soldered to it and the conductor is suitably insulated and led out of the body of the stylus for connection to the circuitry of the apparatus in the general manner explained above with reference to Fig. 5. It will be understood that the condenser assembly 27—28 is arranged in such a longitudinal position on the body of the stylus as to correspond to the area that is normally gripped between the thumb and fingers when the stylus is gripped in a convenient manner similar to any writing instrument.

The push-button 7 shown in Fig. 1 may as already indicated serve to actuate a bell or similar alarm within the apparatus and may be used in studying the subject's reactions to such an unexpected event as the ringing of the alarm. Chronometer S may be used to study the subject's reaction time as well as the time taken to complete the test.

It will be understood that the details of embodiment described and illustrated are exemplary only and that many modifications therein and additions thereto may be made without departing from the scope of the invention. Thus, the visual indicating means shown may readily be supplemented by recording means whereby there may be obtained as the result of each test a test sheet with the data recorded thereon in printed form and/or in the form of graphs, graphs being especially useful in connection with the muscular pressure data described above. Since such more or less conventional refinements may be devised easily enough by those familiar with the art it is deemed superfluous to describe them in greater detail herein and they are to be considered as included in the scope of the invention.

What I claim is:

1. In psychological testing apparatus, means defining a sinuous track between boundaries and having a number of elementary segments of a plurality of types, with each type corresponding to a particular psychological trait, a stylus adapted to be grasped by a test subject for tracing said track, means sensing a contact of the stylus with a boundary of the track in each of said elementary segments, and means for separately counting the number of said contacts occurring in each type of track segment, whereby the relative counts will provide a rating of the relative dominance of said traits in the subject's psychology.

2. In psychological testing apparatus, means defining a sinuous track between boundaries and having a number of elementary segments of a plurality of types, with each type corresponding in shape to a definite elementary graphic sign of handwritten script, a stylus in the general form of a writing instrument adapted to be grasped by a test subject for tracing the track, electric means sensing a contact of the stylus with a boundary of the track, and a plurality of separate counter means connected with said sensing means for separately totalizing the numbers of said contacts that have occurred in each type of track segment.

3. In apparatus of the type described, means defining a sinuous track, a stylus adapted to be grasped by a test subjected for tracing the track, pressure sensing means in said stylus responsive to finger pressure exerted thereon, and means for indicating said pressure.

4. In apparatus of the type described, means defining a sinuous track between boundaries and having a number of elementary segments of a plurality of shapes, with each shape generally corresponding to a particular elementary graphic sign of handwritten script, a stylus in the general form of a writing instrument adapted to be grasped by a test subject for tracing the tack, means sensing a contact of the stylus with a boundary of the track, pressure-sensing means in the stylus responsive to the subject's finger pressure thereon, counter means connected with said contact sensing means for separately totalizing and indicating the numbers of contacts occurring in all of the segments of a particular shape, and means connected with said pressure sensing means for indicating the pressures sensed thereby.

5. In apparatus of the type described, means defining a sinuous track between boundaries and having a number of elementary segments of a plurality of types, with each type generally corresponding in shape to a particular graphic sign of handwritten script, a stylus in the general form of a writing instrument adapted to be grasped by a test subject for tracing the track, means sensing a contact of the stylus with a boundary of the track, pressure-sensing means associated with the track responsive to pressure exerted thereon through the stylus, counter means connected with the contact sensing means for separately totalizing and indicating the numbers of contacts occurring in all segments of each type, and means connected with said pressure sensing means for indicating said pressures.

6. In apparatus of the type described, means defining a sinuous track between boundaries and having a number of elementary segments of a plurality of types, with each type generally corresponding in shape to a particular graphic sign of handwritten script, a stylus in the form of a writing instrument adapted to be grasped by a test subject for tracing the track, electrical means connected with said stylus and said track defining means for sensing stylus contact with a boundary of the track, first pressure sensing means associated with the stylus and responsive to finger pressure on the stylus and second pressure sensing means associated with the track and responsive to pressure of application of the stylus against the track, first electric circuit means connected to the first pressure sensing means and energizable every time the pressure sensed thereby exceeds a predetermined value, second electric circuit means connected to the second sensing means and energizable every time the pressure sensed thereby exceeds a predetermined value, and separate counter means connected to said contact sensing means, to said first pressure sensing means and to said second pressure sensing means, respectively, for separately totalizing and indicating the numbers of stylus contacts that have occurred in each type of segment and the numbers of times said first and second-sensed pressures have exceeded said respective values.

7. In apparatus of the type described, means defining a sinuous track between boundaries and having a number of elementary segments of a plurality of types, with each type having a predetermined shape, a stylus in the form of a writing instrument adapted to be grasped by a test subject for tracing the track, electric circuit means connected with the track-defining means and with the stylus for sensing a contact of the stylus with a boundary of the track, first capacitive pressure pick-off means in the stylus responsive to the subject's finger pressure thereon, second capacitive pressure pick-off means in the track responsive to stylus pressure thereon, counter means connected with said contact sensing means for separately totalizing and indicating the numbers of contacts occurring in each type of segment, and first and second indicating means respectively connected with said first and second capacitive means for indicating said respective pressures.

References Cited in the file of this patent

UNITED STATES PATENTS

| | | |
|---|---|---|
| 1,453,667 | Gillis | May 1, 1923 |
| 1,584,613 | Comstock et al. | May 11, 1926 |
| 2,521,500 | Braund | Sept. 5, 1950 |
| 2,755,796 | Boucke | July 24, 1956 |

FOREIGN PATENTS

| | | |
|---|---|---|
| 318,627 | Germany | Feb. 3, 1920 |
| 333,362 | Germany | Feb. 24, 1921 |